United States Patent Office 3,630,979
Patented Dec. 28, 1971

3,630,979
POLYVINYL CHLORIDE STABILIZED WITH SULFUR DIOXIDE COMPLEXES OF ALKALINE EARTH METAL PHENATES
Mark W. Pollock, Teaneck, N.J., assignor to Argus Chemical Corporation, Brooklyn, N.Y.
No Drawing. Filed June 12, 1970, Ser. No. 45,733
Int. Cl. C08f 45/62
U.S. Cl. 260—23 XA                          9 Claims

ABSTRACT OF THE DISCLOSURE

This invention provides an alkaline earth metal complex formed by the reaction of alkaline earth metal phenate with an inorganic acid anhydride, in the absence of water. The complex is free from alkaline earth metal in excess of that stoichiometrically required to form the phenate and is free from the salt of the alkaline earth metal and the inorganic acid anhydride. The alkaline earth metal phenate complex has a reduced alkalinity as compared to the alkaline earth metal phenate. This invention also provides a polyvinyl chloride resin stabilizer comprising the alkaline earth metal phenate complex plus any one, or combination, of the following stabilizers: a polyvalent heavy metal salt of an organic carboxylic acid having from two to about eighteen carbon atoms, an organic compound containing at least one epoxy group and having from 10 to 150 carbon atoms, and/or an organic triphosphite. The invention also provides a polyvinyl chloride resin composition containing a combination of the alkaline earth metal phenate complex plus one of the three other stabilizers listed above.

This invention relates to new stabilizer compositions for polyvinyl chloride resins and to polyvinyl resin compositions having an improved initial color incorporating such stabilizer compositions.

The alkaline earth metal salts of alkyl substituted phenols are now widely used for stabilization of polyvinyl chloride resins against discoloration during processing. In most cases they are employed in conjunction with other stabilizers, such as, for example, the heavy metal salts of higher fatty acids, as described in U.S. Pat. No. 2,716,092 patented Aug. 23, 1955 to William E. Leistner and Arthur C. Hecker. Organic phosphites can also be included in these compositions as an anti-clouding agent retarding precipitation of metal halide from the stabilizer-resin composition as a cloud or haze.

Compositions including such alkaline earth metal salts of alkyl phenols are strongly alkaline, and this alkalinity is not always desirable. The higher the alkalinity of the phenate, the more difficult it is to retain good initial color in the stabilized resin composition.

Pat. No. 2,968,642 to Le Suer describes stabilizer compositions for polyvinyl chloride resins containing an alkyl phenol and at least two equivalents of barium per equivalent of phenol, twice as much barium as is needed to form the barium phenate. The objective is to incorporate large amounts of barium into the resin, more than can be provided by the phenate, and the phenate serves to disperse the barium compound, which perforce is supplied as an inorganic base reacted in situ in the phenate with an acidic gas to form the corresponding inorganic salt, which is incompatible with the resin. The excess inorganic barium salt provides an alkaline reserve indicated to be essential in the stabilization, and it is stressed that this salt is necessarily formed before any barium phenate reacts with the acidic gas.

In accordance with the instant invention, it has been determined that polyvinyl chloride resin compositions having good stability characteristics are obtainable if there is employed as a stabilizer component a complexed essentially neutral alkaline earth metal phenate, free from alkaline earth metal in excess of that stoichiometrically required to form the phenate. Such compositions may include other stabilizers for polyvinyl chloride resins, such as the heavy metal fatty acid salts and organic phosphites, in which combinations the stabilizing effects of the alkaline earth metal phenate complexes of the invention are especially advantageous. The reduced alkalinity is obtained by treating the alkaline earth metal phenate with a compound which is the anhydride of an inorganic acid, and is used in gaseous or liquid form.

It is thought that the increased effectiveness of the thus-treated alkaline earth metal phenates is associated with retention of the stoichiometrically equivalent proportions of alkaline earth metal and phenol, with reduction of the alkalinity normally possessed by such phenates. There is accordingly no inorganic alkaline earth metal salt present.

It is in most cases preferred to employ a phenate whose basicity is less than about 50% of the basicity of the starting alkaline earth metal alkaline phenate.

The alkaline earth metal phenates of the invention can be defined by the following formula:

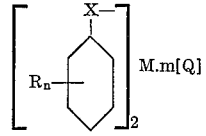

in which R is hydrogen or an alkyl group having from one to twenty-four carbon atoms, n is the number of R groups on the benzene ring, from one to five, X is oxygen or sulfur, and in the case when X is sulfur the resulting phenate is a thiophenate, M is an alkaline earth metal, Q is an anhydride of an inorganic acid and m is the number of moles of anhydride. Free phenol is not formed in the gas treatment of the invention, due to the absence of water. There is no salt formation with the metal M, because there is no water present to react with the gas to form the salt anion. The gas is associated with the phenate in the form of a complex of unknown structure. Any alkaline earth metal can be employed, such as magnesium, calcium, strontium and barium. Barium is preferred.

Typical phenols include phenol, the cresols, the xylenols, n-butyl phenol, isoamyl phenol, ethyl phenol, isopropyl phenol, isooctyl phenol, 2-ethylhexyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, di-t-dodecyl phenol, and ortho or para phenyl phenol; and thiophenol, para-t-butyl-thiophenol, para-isopropyl-2-methyl-thiophenol. The metal phenolate should be soluble in the chlorine-containing resin and plasticizer mixture.

The treated alkaline earth metal phenate complexes employed as stabilizers for polyvinyl chloride resins in accordance with the invention are prepared from the corresponding alkaline earth metal phenate in the absence of water. It is important that the phenate and not a mixture of phenol and alkaline earth metal salt or base be used as the starting material and that water be absent, since otherwise the desired product with its important stabilizing properties is not obtained. The phenate is dissolved in a suitable solvent mixture such as, for example, a blend of 20% isooctanol and 80% mineral sipirits, and then treated with the liquid or gaseous inorganic acid anhydride. Any organic solvent in which the phenate is soluble can be employed. Hydrocarbons and organic alcohols are preferred solvents.

Any inorganic acid anhydride can be employed. Sulfur dioxide and carbon disulfide are preferred, but carbon dioxide, sulfur trioxide, nitric oxide, nitrogen trioxide, nitrogen tetroxide, and nitrogen pentoxide also can be used.

The reaction can be carried out at room temperature. The reaction is exothermic, and the temperature will increase during the reaction, while the basicity will decrease. Reaction is usually complete in from ½ hour to twelve hours. The course of the reaction is followed by noting the decrease in basicity as the compound reacts with the phenate. It is usually preferable to reduce the basicity to less than 50% of that of the starting phenate.

In conjunction with the complexed alkaline earth metal phenate, there can also be used an organic phosphite. In these combinations the phosphite has the function of anticlouding agent, and also contributes to the stabilizing action of the phenate complex. These phosphites are described by the formula $(RA)_3P$ in which A is oxygen or sulfur and the R groups are selected from aryl, alkyl aralkyl, alkaryl, cycloaliphatic and heterocyclic groups having from one to twenty carbon atoms and from one to three heterocyclic atoms other than nitrogen. These groups may be present in any combination. Exemplary are triphenyl phosphite, tricresyl phosphite, tri(dimethylphenyl) phosphite, tri-n-butyl phosphite, triisooctyl phosphite, tridodecyl phosphite, diisooctyl phenyl phosphite, isooctyl diphenyl phosphite, tri(p-t-octylphenyl)phosphite, tri(p-t-nonylphenyl) phosphite, tri(p-t-nonyl-o-cresyl) phosphite, tribenzyl phosphite, isobutyl decresyl phosphite, isooctyl di(p-t-octylphenyl) phosphite, tri(2-ethylhexyl) phosphite, tri(2-cyclohexylphenyl) phosphite, tri-α-naphthyl phosphite, tri(diphenyl) phosphite, tri(2-phenylethyl) phosphite, trifuryl phosphite, tritetrahydrofurfuryl phosphite, tricyclohexyl phosphite, tricyclopentyl phosphite, tri(p-tertiary-butyl phenyl) phosphorothioite, tri-dodecyl phosphorothioite.

As a supplemental metal salt stabilizer there can be employed a salt of a polyvalent metal and an organic acid having from two to eighteen carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulfur and hydroxyl. The oxygen-containing heterocyclic acids include oxygen and carbon in the ring structure of which alkyl-substituted furoic acids are exemplary. As exemplary of the acids there can be mentioned the following: acetic, propionic, butyric, caproic acid, capric acid, 2-ethyl hexoic acid, lauric acid, chlorocaproic acid, hydroxy capric acid, stearic acid, palmitic acid, oleic acid, myristic acid, dodecyl thioether propionic acid $C_{12}H_{25}$—S—$(CH_2)_2COOH$, hexahydrobenzoic acid, benzoic acid, phenylacetic acid, isobutyl benzoic acid, monoethyl ester of phthalic acid, ethyl benzoic acid, isopropyl benzoic acid, ricinoleic acid, p-t-butylbenzoic acid, n-hexyl benzoic acid, salicylic acid, naphthoic acid, 1-naphthalene acetic acid, orthobenzoyl benzoic acid, naphthenic acids derived from petroleum, abietic acid, dihydroabietic acid, and methyl furoic acid. These are used in the form of their heavy metal salts, such as the alkaline earth metal salts, magnesium, barium, strontium and calcium; the zinc, cadmium, and lead and tin salts can be used in addition, if desired. Where these salts are not known, they are made by the usual types of reaction, such as by mixing the acid, acid chloride or anhydride with the corresponding oxide or hydroxide of the metal in a liquid solvent, and heating, if necessary, until salt formation is complete. The cadmium and zinc compounds are preferred.

A preferred stabilizer combination in accordance with the invention comprises the alkaline earth metal phenate complex as defined above and a salt of a polyvalent heavy metal and an organic acid having from two to eighteen carbon atoms. Another preferred combination of stabilizers includes these stabilizers with an organic phosphite, in addition.

Also effective stabilizers are organic compounds containing at least one epoxy group. These compounds may be used to supplement the essential stabilizers. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic and alicyclic groups can also be present. The compounds have from 10 to 150 carbon atoms. The longer chain aliphatic compounds of 22 carbon atoms and more are also plasticizers. Typical epoxy compounds that are not plasticizers are epoxy carboxylic acids such as epoxy stearic acid, glycidyl ethers of polyhydric alcohols and phenols, such as tri-glycidyl glycerine, diglycidyl ether of diethylene glycol, glycidyl epoxy stearyl ether, 1,4-bis(2,3-epoxy propoxy)benzene, and reaction products of 4,4'-dihydroxy-benzophenone and 1,5-dihydroxy naphthalene with halogen-containing epoxides such as 3-chloro-1,2-epoxy butane, 3-chloro-1,2-epoxy octane, and epichlorhydrin. Typical epoxy compounds that combine stabilizing with plasticizing action are listed below under plasticizers.

The invention is applicable to any polyvinyl chloride resin. The term "polyvinyl chloride" as used herein is inclusive of any polymer formed at least in part of the recurring group

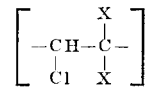

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

There is incorporated usually a plasticizer for the resin, such as dioctyl phthalate, dioctyl sebacate, tricresyl phosphate, and octyl diphenyl phosphate.

Particularly useful plasticizers are the epoxidized higher fatty acid esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythitol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. also useful are the epoxidized mixtures of higher fatty acid esters found in naturally-occurring oils such as epoxidized soyabean oil, epoxidized glycerol trioleate, epoxidized cottonseed oil, epoxidized tall oil fatty acid esters, epoxidized coconut oil and epoxidized tallow. Of these, epoxidized soyabean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5% of a parting agent, also can be included. Typical parting agents are the higher aliphatic acids having from twelve to twenty-four carbon atoms such as stearic acid, lauric acid, palmitic acid and myristic acid, mineral lubricating oils, polyvinyl stearate, polyethylene and paraffin wax.

A total of from 0.5 to 10 parts by weight of stabilizer is used for each 100 parts by weight of the resin. All of this can be alkaline earth metal phenate complex if desired, but it is usually preferable to employ a combination of this with the heavy metal organic acid salt and, optionally, an organic phosphite. More stabilizer composition by weight of the polyvinyl chloride resin can be used, but no better result is obtained, and therefore such amounts are uneconomical and wasteful. The plasticizer can be used in an amount within the range from 0 to 100 parts by weight of the resin.

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-roll mill at from 250 to 350° F. for a time sufficient to form a homogeneous sheet. Five minutes usually is sufficient. After the mass is uniform, it is sheeted off in the usual way.

The following examples in the opinion of the inventors constitute preferred embodiments of their invention.

PREPARATION A

The carbonated barium nonyl phenate used in Examples 1 and 2 was prepared as follows: 393 grams of barium nonyl phenate was dissolved in a solvent mixture comprising 20% isooctanol and 80% mineral spirits, to produce a solution containing 12.5% barium. This solution was sparged with carbon dioxide at room temperature for 60 minutes. During the sparging the temperature gradually rose to 45° C. There was a total pickup of 21 grams of carbon dioxide by weight of the mixture, and the basicity decreased from 1.58 milliequivalents per milliliter to 0.129 milliequivalent per milliliter.

EXAMPLE 1

Two resin formulations were prepared, having the following composition:

| Plastic composition | Parts by weight | |
|---|---|---|
|  | I | II |
| Geon 101 Ep (homopolymer of polyvinyl chloride) | 100 | 100 |
| Diocty phthalate | 45 | 45 |
| Epoxidized 2-ethylhexyl ester of tall oil fatty acids | 5 | 5 |
| Cadmium-2-ethyl-hexoate | 0.25 | 0.25 |
| Monoisooctyl diphenyl phosphite | 0.5 | 0.5 |
| Carbonated barium nonyl phenate | 0 | 0.5 |
| Barium nonyl phenate | 0.5 | 0 |

The dioctyl phthalate, cadmium-2-ethyl-hexoate, epoxidized tall oil fatty acid esters, phenates or phenate complex and monoisooctyl diphenyl phosphite were mixed together and then blended with the polyvinyl chloride. The mixture was then heated on a two roll mill up to 350° F., and then heated in an oven at 350° F. for one hour.

The carbonated barium nonyl phenate gave a distinct improvement in preventing discoloration during this period.

EXAMPLE 2

A series of compositions was made up of the following formulation.

| Plastic composition | Parts by weight | | | |
|---|---|---|---|---|
|  | I | II | III | IV |
| Geon 103 Ep (homopolymer of polyvinyl chloride) | 100 | 100 | 100 | 100 |
| Dioctyl phthalate | 45 | 45 | 45 | 45 |
| Epoxidized isooctyl ester of tall oil fatty acids | 5 | 5 | 5 | 5 |
| Cadmium tertiary butyl benzoate | 0.75 | 0.75 | 0.75 | 0.75 |
| Barium nonyl phenate | 0.8 |  | 0.8 |  |
| Carbonated barium nonyl phenate |  | 0.8 |  | 0.8 |
| Stearic acid | 0 | 0 | 0.5 | 0.5 |

The dioctyl phthalate, cadmium tertiary butyl benzoate, epoxidized isooctyl tall oil fatty acid esters, stearic acid, and phenate or phenate complex were mixed together and then blended with the polyvinyl chloride. The mixture was heated on a two roll mill up to 350° F., and then heated in the oven at 350° F. for one hour to determine heat stability.

The carbonated barium nonyl phenate improved the resistance to development of yellow discoloration during the heating.

EXAMPLE 3

A series of formulations was prepared having the formulation of Example 1, employing carbonated calcium, tertiary butyl phenate in place of the carbonated barium nonyl phenate. In this case also the carbonated calcium tertiary butyl phenate was superior to non-carbonated calcium tertiary butyl phenate in delaying development of discoloration.

EXAMPLE 4

A series of compositions was prepared having the formulation of Example 2, employing both carbonated and noncarbonated strontium dodecyl phenate. The carbon-strontium dodecyl phenate was superior in delaying development of yellow discoloration during the heating.

PREPARATION B

Fifty grams of a solution of barium nonyl phenate in a solvent mixture of 20% isooctanol and 80% mineral spirits having a barium content of 12.5% and a basicity of 1.77 meq./gram, was mixed with 9 grams of liquid carbon disulfide and heated on a boiling water bath under reflux for twelve hours. The product obtained had a basicity of 0.84 meq./gram.

EXAMPLE 5

A series of compositions was prepared having the formulation of Example 2, employing barium nonyl phenate both treated with carbon disulfide and untreated, as in Example 2, and with and without stearic acid. The addition of the barium nonyl phenate complex was superior in delaying development of yellow discoloration.

PREPARATION C

Barium nonyl phenate sulfur dioxide complex was prepared in the following manner: 393 grams of barium nonyl phenate was dissolved in a solvent mixture comprising 20% isooctanol and 80% mineral spirits, to produce a solution containing 12.5% barium. 100 grams of this solution was sparged with dry sulfur dioxide at room temperature for one hour. The sulfonating process was exothermic and was continued until the solution tested slightly acid to moist pH indicator paper. There was a total weight pickup of 6.4 grams of sulfur dioxide resulting in a sulfonated barium nonyl phenate containing 12.1% barium by analysis.

PREPARATION D

A sulfur dioxide treated oil-soluble composition was prepared in the following manner. A solvent mixture of 20.3 grams of oleyl alcohol, 51.0 grams of mineral oil, 10.0 grams of nonyl phenol, and 11.05 grams of water was heated to 70° C. 23.3 grams of barium oxide was added and the mixture was refluxed at 100° C. for one hour and subsequently further heated to 150° C. While maintaining the temperature at approximately 150° C., a stream of sulfur dioxide was bubbled through. Gas treatment resulted in foaming of the mixture. It was found that 1.2 grams of sulfur dioxide had been taken up during treatment. The treated solution was filtered and tested slightly acid; by analysis it contained 15.15% barium.

EXAMPLE 6

Resin formulations were prepared having the following composition:

| Plastic composition | Parts by weight | | | |
|---|---|---|---|---|
| | I | II | III | IV |
| Copolymer of 95% vinyl chloride and 5% vinyl acetate | 100 | 100 | 100 | 100 |
| Dioctyl phthalate | 42 | 42 | 42 | 42 |
| Epoxidized soyabean oil | 3 | 3 | 3 | 3 |
| Cadmium napthenate | 0.4 | 0.4 | 0.4 | 0.4 |
| Barium nonyl phenate sulfur dioxide complex solution of Preparation C | | | | 1.1 |
| Sulfur dioxide treated oil-soluble composition of Preparation D | | | 0.9 | |
| Barium nonyl phenate | | 1.1 | | |

The quantity of barium composition added to the above plastic compositions was calculated on the basis of the barium analysis of each barium composition added, so that the resultant barium content of plastic compositions II, III, and IV, would be the same.

The dioctyl phthalate, expoxidized soybean oil, cadmium naphthenate and barium composition, where added, were mixed together and then blended with the vinyl copolymer to form the above plastic compositions. Each of the plastic compositions was then blended on a two roll mill at 350° F.

Test strips of milled plastic compositions I to IV were heated in an oven at 350° F. and test samples thereof removed from the oven at fifteen minute intervals until failure or the expiration of two hours, whichever occurred first. The following results were obtained:

| Oven exposure at 350° F. | Plastic compositions | | | |
|---|---|---|---|---|
| | I | II | III | IV |
| 15 minutes | Light brown | Light yellow | Very light | Clear. |
| 75 minutes | Failure (dark brown, black edges) | Light orange | Yellow brown | Light orange. |
| 120 minutes | | | Orange | Failure (black edges and spots) | Do. |

As is indicated in the above table, plastic composition IV, containing the barium phenate complex of Preparation C in accordance with this invention, was in on way discolored after 15 minutes while each of the other plastic compositions showed at least traces of color instability. Plastic composition I, containing no barium stabilizer, failed after seventy-five minutes, and plastic composition III containing the sulfur dioxide treated oil-soluble composition of Preparation D failed after two hours, whereas the plastic compositions stabilized in accordance with this invention did not fail during the entire oven heating period. The composition stabilized in accordance with this invention retained better color at the end of the test than the composition containing untreated barium nonyl phenate.

Test strips of milled plastic compositions I to IV were also heated in an oven at 375° F. and test samples thereof removed from the oven at fifteen minutes intervals, yielding the following results. The plastic composition including a stabilizer in accordance with this invention (IV) was initially clear, whereas the composition including untreated barium nonyl phenate (II) had a very slight initial yellow color. After fifteen minutes the sample (I) without barium stabilizer had turned brown, while the other compositions were light yellow. Plastic composition III containing the sulfur dioxide treated oil-soluble composition of Preparation D failed after 75 minutes and II and IV failed after two hours in the oven at 375° F. The barium nonyl phenate sulfur dioxide complex of this invention thus demonstrated better initial color than untreated barium nonyl phenate and greater stability to high temperature degradation over a prolonged period than the sulfur dioxide treated oil-soluble composition of Preparation D. The advantage of barium phenate sulfur dioxide complexes free from barium in excess of that stoichiometrically required to form the phenate and having only one equivalent of barium per equivalent of phenol, in accordance with this invention, is thus demonstrated.

EXAMPLE 7

A series of compositions was made up of the following formulation:

| Plastic composition | Parts by weight | |
|---|---|---|
| | I | II |
| Diamond 450 homopolymer of polyvinyl chloride | 100 | 100 |
| Dioctyl phthalate | 45 | 45 |
| Epoxidized isooctyl ester of tall fatty acids | 5 | 5 |
| Isooctyl diphenyl phosphite | 0.75 | 0.75 |
| Stearic acid | 0.5 | 0.5 |
| Cadmium tertiary butyl benzoate | 0.3 | 0.3 |
| Barium nonyl phenate | 0.8 | |
| Barium nonyl phenate sulfur dioxide complex solution of Preparation C | | 1.70 |

The amount of barium composition added to each of the above plastic compositions was calculated to yield the same barium content in each composition. The dioctyl phthalate, expoxidized isooctyl ester, isooctyl diphenyl phosphite, stearic acid, cadmium t-butyl benzoate, and phenate or phenate complex were mixed together and then blended with polyvinyl chloride. The mixture was blended on a two roll mill at 350° F.

Test strips of milled plastic compositions I and II were heated in an oven at 350° F. and test samples thereof removed from the oven at fifteen minute intervals until failure or the expiration of two hours, whichever occurred first. The following results were obtained: Plastic composition I was initially very slightly yellow, while composition II, incorporating a treated phenate complex in accordance with this invention, was clear. Composition I first showed some additional yellow discoloration after sixty minutes, while the composition of this invention (II) showed no color formation until after seventy-five minutes. Composition I failed after two hours, while II did not fail during the course of the test.

When exposed in the oven at 375° F. the gas-treated product of this invention showed similar superiority over the untreated product both in preventing initial discoloration, color change after fifteen minutes, and time to failure. Thus, the barium nonyl phenate sulfur dioxide complex displayed a distinct improvement in preventing discoloration at elevated temperatures.

EXAMPLE 8

In order to demonstrate another advantage of the products of this invention, namely, that they do not produce the "plating out" effect, the following test was carried out.

"Plating out" is the condition of stabilizer-pigment buildup in calender rolls, usually associated with barium-cadmium and barium-zinc systems.

In this test, 1 gram of red pigment, Watching Red, was added to each 100 grams of polymer compositions I and II of Example 7, above, and milled in a two roll mill. The pigment goes into the resin, and colors it a dark red. The resin left on the rolls due to plating out is thus red and will stain the next batch that is processed on this equipment, called a clean-up batch. The amount or intensity of the color in the clean-up batch is a measure of the amount of plating out by the preceding batch.

Each of the two red-dyed formulations was milled, removed from the mill in the normal manner, and after each of these batches a clean-up batch was put through the mill. Each of the clean-up batches was constituted as follows:

|  | Parts by wt. |
|---|---|
| Polyvinyl chloride homopolymer | 100 |
| Dioctyl phthalate | 30 |
| $TiO_2$ | 2 |
| $CaSiO_3$ | 2 |
| Stearic acid | 0.5 |
| Barium-cadmium stabilizer | 2 |

The clean-up batches were checked for discoloration when they were removed from the mill, and sample strips thereof were prepared.

The clean-up batch from polymer composition I had a light ping color indicating that the untreated barium nonyl phenate displayed some of the "plating out" effect which is characteristic of barium and cadmium compounds. The clean-up batch from polymer omposition II was white and not discovered by any residual red pigment. It is thus apparent that alkaline earth metal phenates treated with an anhydride of an inorganic acid to yield the complex of this invention do not, when used as polyvinyl chloride resin stabilizers, have any tendency to "plate out." This represents a distinct practical advantage.

Having regard to the foregoing disclosure, the following is claimed as the inventive and patentable embodiments thereof:

1. A polyvinyl chloride resin stabilizer which comprises an alkaline earth metal phenate complex formed by reaction of alkaline earth metal phenate with sulphur dioxide in the absence of water, the complex being free from alkaline earth metal in excess of that stoichiometrically required to form the phenate and free from salt of the alkaline earth metal and the sulfur dioxide and having a reduced alkalinity as compared to the alkaline earth metal phenate, and a polyvalent heavy metal salt of an organic carboxylic acid containing from about two to about eighteen carbon atoms.

2. A polyvinyl chloride resin stabilizer comprising an alkaline earth metal phenate complex according to claim 1 and an organic compound containing at least one epoxy group and having from 10 to 150 carbon atoms, the epoxy compound being present in an amount effective to increase the stabilizing activity of the phenate complex.

3. A polyvinyl chloride resin stabilizer comprising an alkaline earth metal phenate complex according to claim 1 and an organic triphosphite having the formula

wherein $R_1$, $R_2$ and $R_3$ are organic hydrocarbon radicals having from one to about twenty carbon atoms, and A is selected from the group consisting of oxygen and sulfur.

4. A polyvinyl chloride resin stabilizer comprising an alkaline earth metal phenate complex according to claim 1, a polyvalent heavy metal salt of an organic carboxylic acid containing from about two to about eighteen carbon atoms, and an organic triphosphite having the formula

wherein $R_1$, $R_2$ and $R_3$ are organic hydrocarbon radicals having from about one to about twenty carbon atoms, and A is selected from the group consisting of oxygen and sulfur.

5. A polyvinyl chloride resin composition comprising a polyvinyl chloride resin and a stabilizer combination present in an amount effective to improve resistance of the resin to discoloration when heated at 350° F., comprising an alkaline earth metal phenate in accordance with claim 1, and a polyvalent heavy metal salt of an organic carboxylic acid containing from about two to about eighteen carbon atoms.

6. A polyvinyl chloride resin composition in accordance with claim 5 comprising in addition an organic compound containing at least one epoxy group and having from 10 to 150 carbon atoms.

7. A polyvinyl chloride resin composition in accordance with claim 5 comprising in addition an organic triphosphite having the formula

wherein $R_1$, $R_2$ and $R_3$ are organic hydrocarbon radicals having from about one to about twenty carbon atoms, and A is selected from the group consisting of oxygen and sulfur.

8. A polyvinyl chloride resin composition in accordance with claim 7 comprising in addition an organic compound containing at least one epoxy group and having from 10 to 150 carbon atoms.

9. A polyvinyl chloride resin composition in accordance with claim 5 in which the polyvinyl chloride resin is a polyvinyl chloride homopolymer.

References Cited
UNITED STATES PATENTS

| 2,867,594 | 1/1959 | Hansen et al. | 260—23 |
| 2,968,642 | 1/1961 | Le Suer | 260—45.75 |
| 3,202,632 | 8/1965 | Lally et al. | 260—45.95 |
| 3,274,135 | 9/1966 | Norman et al. | 260—23 |

DONALD E. CZAJA, Primary Examiner

R. A. WHITE, Assistant Examiner

U.S. Cl. X.R.

252—400; 260—45.7 P, 45.7 PS, 45.75 R, 45.8 A, 45.85, 45.95, 137

UNITED STATES PATENT OFFICE
CERTIFICATE OF CORRECTION

Patent No. 3,630,979          Dated December 28, 1971

Inventor(s) Mark W. Pollock

It is certified that error appears in the above-identified patent and that said Letters Patent are hereby corrected as shown below:

| | | |
|---|---|---|
| Column 4, line 61 | : | "polylhydric" should be -- polyhydric -- |
| Column 4, line 72 | : | "acid. also" should be -- acid. Also -- |
| Column 5, line 60 | : | "Diocty" should be -- Dioctyl -- |
| Column 6, line 37 | : | "carbon-" should be -- carbonated -- |
| Column 7, line 53 | : | "on" should be -- no -- |
| Column 9, line 1 | : | "Watching" should be -- Watchung -- |
| Column 9, line 11 | : | "was" should be -- were -- |
| Column 9, line 14 | : | "constiuted" should be -- constituted -- |
| Column 9, line 28 | : | "ping" should be -- pink -- |
| Column 9, line 32 | : | "discovered" should be -- discolored -- |

Column 10, lines 10-12 :

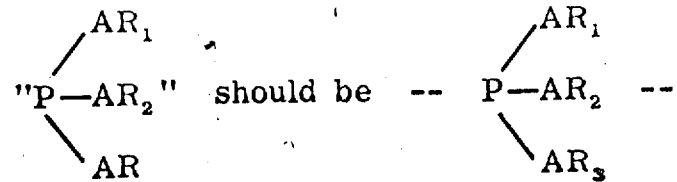

Signed and sealed this 6th day of February 1973.

(SEAL)
Attest:

EDWARD M. FLETCHER, JR.
Attesting Officer

ROBERT GOTTSCHALK
Commissioner of Patents